United States Patent [19]

Yamada et al.

[11] Patent Number: 4,853,923
[45] Date of Patent: Aug. 1, 1989

[54] MANETO-OPTICAL RECORDING APPARATUS WITH PATH LENGTH COMPENSATED DUAL PHOTO-ELECTRIC CONVERSION

[75] Inventors: Tomoaki Yamada, Yokohama; Yuwa Ishii, Kawasaki, both of Japan

[73] Assignee: Nikon Corporation, Tokyo, Japan

[21] Appl. No.: 939,026

[22] Filed: Dec. 8, 1986

[30] Foreign Application Priority Data

Dec. 12, 1985 [JP] Japan .................... 60-279589

[51] Int. Cl.4 .................................. G11B 7/00
[52] U.S. Cl. .................... 369/120; 369/13; 369/110
[58] Field of Search .......... 369/45, 46, 110, 120, 369/13; 250/201 DF; 350/170, 171, 173

[56] References Cited

U.S. PATENT DOCUMENTS

| 4,505,584 | 3/1985 | Kato et al. | 369/46 X |
| 4,507,763 | 3/1985 | Kato | 369/46 X |
| 4,599,714 | 7/1986 | Endo | 369/13 |
| 4,612,437 | 9/1986 | Ohsato | 369/46 X |
| 4,631,397 | 12/1986 | Ohsato et al. | 369/46 X |
| 4,721,368 | 1/1988 | Deguchi et al. | 369/13 X |
| 4,779,250 | 10/1988 | Koguri et al. | 369/13 |

FOREIGN PATENT DOCUMENTS

| 57-88540 | 6/1982 | Japan | 369/13 |
| 57-169947 | 10/1982 | Japan | 369/46 |
| 59-77649 | 5/1984 | Japan | 369/13 |
| 60-20340 | 2/1985 | Japan | 369/13 |

Primary Examiner—Aristotelis M. Psitos
Attorney, Agent, or Firm—Shapiro and Shapiro

[57] ABSTRACT

An optical pickup apparatus comprises two photodetectors disposed on one and the same substrate. The light beam from the recording medium is divided into two light components by an optical member and the two light components are guided to the two photodetector positioned on the same substrate.

3 Claims, 3 Drawing Sheets

PRIOR ART

MAGNETO-OPTICAL RECORDING APPARATUS WITH PATH LENGTH COMPENSATED DUAL PHOTO-ELECTRIC CONVERSION

BACKGROUND OF THE INVENTION

1. Field of the Invention

The present invention relates to an optical pickup apparatus for optically reproducing recorded signals in a recording medium. In the apparatus, a beam of light is projected onto the recording medium and the light transmitted through or reflected from the recording medium is divided into two light components. The two components are photoelectrically converted into two signals and the difference between the two signals is detected to reproduced the recorded signal.

2. Related Background Art

In the art, many methods have been known and used for the reproduction of the recorded signals.

Among them, the above-mentioned optical method has particular advantages.

According to the method, a beam of light is projected onto the recording medium and the light transmitted through or reflected from the recording medium is divided into two beams which are then photoelectrically converted into two signals. The difference between the two signals is detected to reproduce the signal recorded in the recording medium. Obviously, this optical method is easy to carry out and it enables removing any in-phase noise in a very simple manner.

For these advantages, the optical signal-reproducing method has been applied to those pickup apparatus in which signals are read out from a magneto-optical recording disc according to the principle of the Kerr effect or the Faraday effect. An example of the prior art optical pickup apparatus has been disclosed in U.S. Pat. No. 4,599,714.

In reproducing signals according to the above optical method, noise, such as disc noise and laser noise may be generated by any damage on the magneto optical recording disc, any irregularity in the laser light source etc. Such noise is in-phase noise which is generated before the splitting of the beam and equally introduced into the split beams. According to the optical method, as shown in the above-referred patent specification, this in phase noise can be removed in a simple manner.

FIG. 1 shows, in sectional view, the construction of the main part of the prior art pickup apparatus for magnetooptical recording disc.

In FIG. 1, the reference numeral 5 denotes a recording medium in which information has been recorded. The apparatus for reproducing the recorded signal comprises a laser diode 1, a collimator lens 2, a beam splitter 3, an objective lens 4, a polarized beam splitter 16 and first and second photodetectors 11 and 12. Denoted by 17 and 18 are printed substrates. The laser diode 1 generates a linearly polarized light beam.

In the prior art apparatus, the reproducing light from the magnetooptical disc 5 is divided into two beams by the polarized beam splitter 16 whose splitting surface is disposed 45° inclined relative to the incident light. The first and second photodetectors 11 and 12 on separate substrates are positioned to receive the split beams by the splitter. An important problem involved in the prior art apparatus is the precise positioning of the polarized beam splitter 16 relative to the two separate photodetectors 11 and 12. A particular structure is required, for the positioning and a particular positioning operation is needed.

The number of working steps needed for the apparatus is undesirably increased by the positioning. In addition, wiring is required to electrically connect the first photodetector with the first substrate and also the second photodetector with the second substrate.

SUMMARY OF THE INVENTION

Accordingly, it is an object of the invention to provide an optical pickup apparatus which is simple in construction.

It is another object of the invention to provide an optical pickup apparatus which has an improved Common Mode Rejection Ratio (hereinafter referred to as CMRR in abridgement).

In attain the objects, these optical pickup apparatus according to the invention comprises two photo-electric conversion means disposed on one and the same substrate. The light beam from the recording medium is divided into two light component by an optical member and the two light components are guided to the two photo-electric conversion means positioned on the same substrate.

According to another feature of the invention, in order to attain the above objects, the apparatus further comprises an optical member which is able to substantially equalize the optical path lengths of the two light components entering the two photo-electric conversion means.

Other and further objects, features and advantages of the invention will appear more fully from the following description taken in connection with the accompanying drawings.

DETAILED DESCRIPTION OF THE PREFERRED EMBODIMENTS

Figure 1:
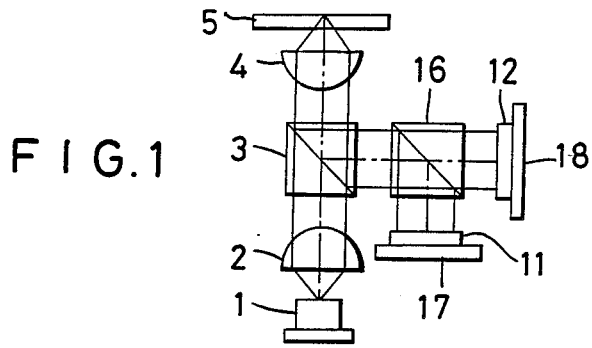
FIG. 1 is a view showing a part of a prior art optical pickup apparatus.
Figure 2A:
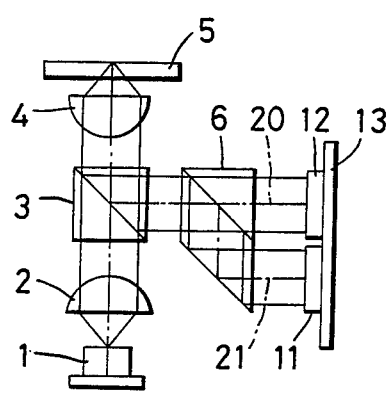
FIG. 2 is a view showing the optical system of an embodiment of the present invention.
FIG. 2B is a block diagram of the embodiment.

In FIG. 2A showing an embodiment of the invention, like reference numerals to FIG. 1 represent the same or corresponding members which need not be further described. The apparatus shown in FIG. 2A is different from the prior art apparatus shown in FIG. 1 in the arrangement of polarized beam splitter 6 and printed substrate 13.

In the embodiment of the present invention shown in FIG. 2A, the polarized beam splitter 6 divides the light beam from the beam splitter 3 into two light components whose optical axes are substantially parallel to each other. Two photodetectors 11 and 12 which may be photodiodes are arranged on the same plane of the printed substrate 13. In other words, the light-receiving surfaces of the two photodetectors 11 and 12 are on the same plane. The positioning of the two photodetectors relative to the polarized beam splitter is, therefore, very easy to carry out. The light-receiving surface of the first photodetector 11 is substantially normal to the optical axis 21. The light-receiving surface of the second photodetector 12 is substantially normal to the optical axis 20. The two optical axes 20 and 21 are parallel to each other.

Figure 2B:
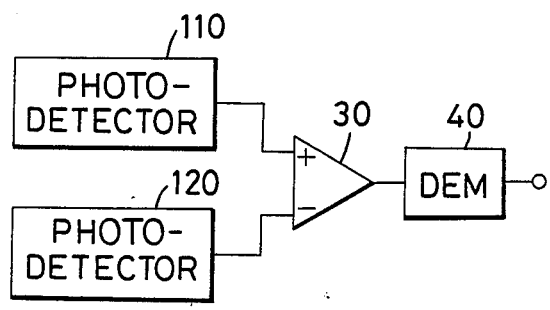

Referring to FIG. 2B, there is shown a part of the circuit according to the invention. The photodetector 110 is constituted of a photo diode 11 and a preamplifier. The second photodetector 120 is constituted of a second photo diode 12 and a preamplifier. The two photodetectors are connected to a differential amplifier 30. The output signal from the differential amplifier is demodulated by a demodulator 40. The photodetectors 110, 120 and the differential amplifier 30 are arranged on the printed substrate 13 previously shown in FIG. 2A.

The apparatus shown in FIG. 2A has a problem that in detecting the difference between the output signals of the two photodetectors CMMR is lowered by the fact that the optical path length from the recording medium to the second photodetector is not equal to the optical path length from the recording medium to the first photodetector.

Generally, when two separate paths are used for signal transmission, the noise on the paths can be reduced to zero (0) by subtraction provided that the noise on the two paths is entirely the same.

In practice, however, such an ideal system is not obtained and, therefore, it is impossible to reduce the noise completely to zero. The degree of deviation from the ideal state can be represented by CMRR (Common mode rejection ratio) in terms of $$-20 \log (B/A) \text{ [dB]}$$

wherein,
 A is a voltage applied to the inversion input and the non-inversion input of the differential amplifier; and
 B is the output obtained when the voltage A is applied (the output is ideally 0).

Accordingly, for an ideal system, the value of CMRR is $\infty$.

In the above-mentioned type of optical pickup apparatus, CMRR is lowered mainly by the following two factors.

The first one is the difference in gain between the two paths. In other words, the gains of the two paths (each includes both of optical system and electrical signal system) are not equal to each other. The second factor is the difference in phase between the two paths (each includes both of optical system and electrical signal system). These differences are attributable to the difference between the two optical path lengths on the side of the optical system and also to the difference between the frequency characteristics of the detectors and amplifiers on the side of the electrical signal system.

Of the two factors, the first one, that is, the gain difference can generally be compensated automatically by use of an AGC (Auto Gain Control) circuit. But, as for the second factor, that is, the phase characteristic difference, it is impossible to automatically correct it.

Let us consider the allowable range of the lowering of CMRR caused by the second factor.

At first, we discuss it regarding the electrical signal system:

Generally, it is unnecessary for us to take the CMRR of the differential amplifier into consideration so much. Although the pre-amplifiers have relatively large difference in phase characteristics, it is possible to keep CMRR at the level of 40 dB by extending the characteristics of the amplifier to a sufficiently high frequency region. Consequently, the level of CMRR of the whole electrical signal system is limited to about 40 dB by the pre-amplifier. It is, therefore, meaningless to further increase the CMRR of other parts beyond the limit of about 40 dB.

Secondly, we discuss the problem regarding the optical system.

In the optical system there exists stray light. For this reason, it is generally admitted that CMRR of an optical system is in the order of 30 dB even for the best-designed optical system. Consequently, the CMRR of the whole optical system is limited to the level of about 30 dB by the stray light. It is meaningless to try to further increase the CMRR of other parts beyond the limit.

In the embodiment shown in FIG. 2A in which two photodetectors are arranged on the same plane, therefore, the total CMRR resulting from both of the electrical signal system and the optical system is limited to the level of about 30 dB by the optical system. This means that the lowering of CMRR by the second factor is allowable so long as it does not lower the CMRR of the total system under 30 dB. As previously described, the second factor is the phase characteristic difference between the two signal transmission paths (each includes both of optical system and electrical signal system). On the side of the optical system, the parameter of the phase characteristic difference is the difference in optical path length between the two paths. On the side of the electrical signal system, it is caused by the difference in frequency characteristics between the detectors and between the amplifiers.

In the case of the FIG. 2A embodiment, the optical path difference may be reduced by reducing the total size of the polarized beam splitter 6. However, this solution will increase the manufacturing cost of the beam splitter 6. It is commercially unacceptable.

Figure 3:
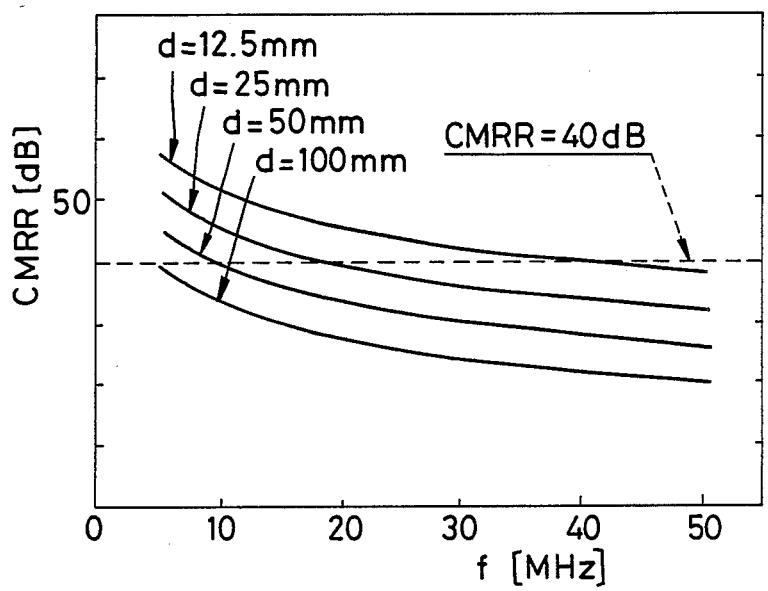
FIG. 3 is a graph showing the relationship among reproducing signal carrier, CMRR and optical path difference.

We have computed the relationship between the frequency of the recording/reproducing signal carrier and the CMRR of the pickup apparatus as shown in FIG. 2A regarding the optical path difference as a parameter. FIG. 3 shows the result. In this connection, it is to be noted that the relation curves shown in FIG. 3 were obtained assuming that the CMRR as determined by other parameters such as differential amplifier, optical system etc. is the ideal value, $\infty$. This is because the purpose for which we conducted the computing was to know how much effect the optical path difference d has on CMRR.

The lowering of CMRR by the optical path difference d is attributable to the phase difference $\phi$ between the two photodetectors' signals. The phase difference $\phi$ is proportional to the value of optical path difference/wavelength of light beam $\lambda$. Furthermore, the reciprocal of the beam wavelength $\lambda$ is proportional to the frequency f of the beam.

These factors and the value of CMRR [CMRR] hold the following relationships:

$$\phi \infty [\text{CMRR}] [\text{CMRR}] \infty \text{d} \cdot \text{f}$$

The optical path difference which gives a certain determined [CMRR] is represented by $$d = k/f \quad (k \text{ is a constant}) \quad (1)$$

From FIG. 3, it is seen that when the target value of CMRR to be determined by the optical path difference is around 40 dB, the target value, 40 dB is attainable by about 5 MHz, 10 MHz, 20 MHz and 40 MHz for the optical path difference 100 mm, 50 mm, 25 mm and 12.5 mm respectively.

If we can determine the range of the optical path difference allowable for the pickup apparatus, we can determine the constant k.

As previously mentioned, even for the apparatus in which the optical path difference is 0 (zero), CMRR is limited to the level of about 40 dB by the pre-amplifier and further to the level of about 30 dB by the stray light in the optical system.

In order to determine the constant k, we set the following conditions:

(1) As a magnetooptical pickup apparatus, CMRR = 30 dB should be attained.

(2) To satisfy the above requirement (1), the level of CMRR solely determined by the optical path difference should be kept at 40 dB at the most.

Since, as previously mentioned, CMRR is affected also by the differential amplifier, pre-amplifier, optical path difference etc. although the stray light is the main cause for the lowering of CMRR, it is reasonable to set the CMRR solely determined by the optical path difference to a level 10 dB lower than the level of CMRR set for the electrooptical pickup apparatus.

From FIG. 3 showing that CMRR = 40 dB when d = 50 mm and f = 10 MHz, the constant k is given by $k \leq d \cdot f = 5 \times 10^8$.

Let the maximum frequency of the apparatus be fmax. Then, $$d \leq 5 \times 10^8 / f_{max} \text{ [mm]} \quad (2)$$

This conditional formula is generally applicable to all magnetooptical pickup apparatus. For example, in case of a magnetooptical pickup apparatus having a fmax = 18 MHz, one can know the necessary value of the optical path difference d from the above formula, which is as follows:

$$d \leq 5 \times 10^8 / 18 \times 10^6 = 28 \text{ mm.}$$

Figure 4:
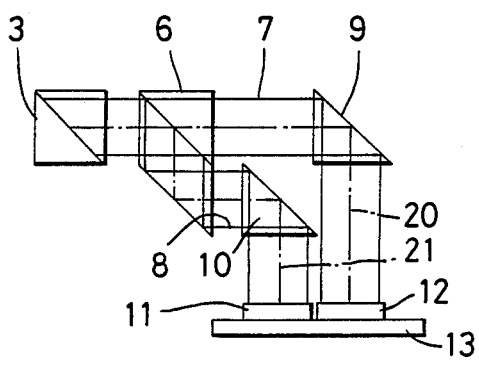
FIG. 4 schematically shows a second embodiment of the invention.

FIG. 4 shows a second embodiment of the present invention. In this figure, the semiconductor laser 1, collimator lens 2, objective lens 4 and recording medium 5 are omitted because they entirely correspond to those of the first embodiment previously shown. The manner of operation of this embodiment as follows:

Again, a beam light is reflected by the recording medium 5 (not shown) and the polarization plane of the beam rotated in accordance with the information written in the recording medium. The beam then enters the polarized beam splitter 6 through the objective lens 4 (not shown) and the beam splitter 3.

Total reflection prisms 9 and 10 are interposed in the optical path between the recording medium 5 and the photodetector 12 and the optical path between the recording medium 5 and the photodetector 11 respectively so that the two optical paths may have approximately the same length. In this embodiment, therefore, the optical path lengths from the recording medium to the two photodetectors can be equalized by a simple adjustment of the positions of the total reflection prisms 9 and 10 while positioning the bottom surfaces of the two photodetectors on the same plane.

Figure 5:
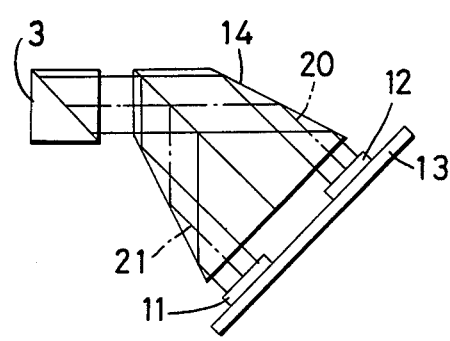
FIG. 5 shows a third embodiment of the invention.

A third embodiment of the invention is shown in FIG. 5.

In this embodiment, a polarized beam splitter 14 having a modified form is used to equalize the two optical path lengths from the recording medium 5 to the photodetectors 11 and 12.

Although not shown in the drawing, like the above second embodiment, a beam of light is projected on the recording medium from a semiconductor laser 1 and the reflected light from the recording medium 5 enters the beam splitter 3.

Thereafter, the light beam enters the photodetectors 11 and 12 from the beam splitter 3 through the modified polarized beam splitter 12. In this embodiment, since the polarized beam splitter 14 has a modified form to equalize the two op path lengths, no additional member is particularly needed to equalize the two optical path lengths. By suitably changing the form of the polarized beam splitter 14, one can easily change the distance between the two photodetectors 11 and 12 on the printed substrate 13 while keeping constant the difference between the two optical path lengths. Therefore, this embodiment enables simplifying the pattern design of the printed substrate 13.

Figure 6:
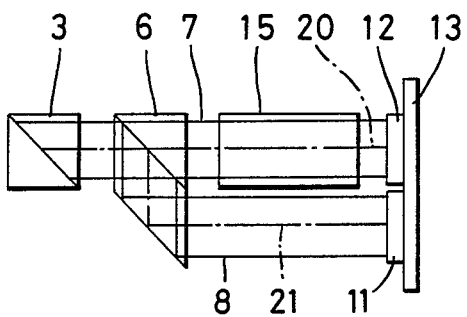
FIG. 6 shows a fourth embodiment of the invention.

FIG. 6 shows a fourth embodiment of the invention. The path of the light beam from a semiconductor laser 1 to a recording medium 5 and then to a beam splitter 3 corresponds to that in the previous embodiments.

From the polarized beam splitter 6, two light beams 7 and 8 are directed to the photodetectors 11 and 12 respectively. However, the beam 7 enters the photodetector 12 through a member 15 of high refractive index whereas the beam 8 is directly incident on the photodetector 11.

By interposing the high refractive index member 15 in one of the two optical paths in this manner, the two optical paths are given substantially the same optical path length. This embodiment is simple in construction. An inexpensive polarized beam splitter 6 can be used with the addition of a high refractive index member 15 having a simple form (prism or cylindrical).

Therefore, this embodiment has an advantage that it is easy to manufacture and the object of the present invention can be attained without increasing the manufacturing cost so much.

Figure 7:
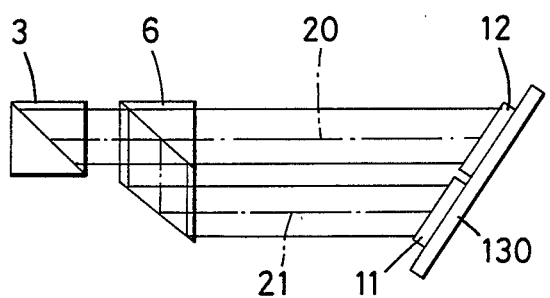
FIG. 7 shows a fifth embodiment of the invention.

According to a fifth embodiment shown in FIG. 7, the optical path difference d is minimized by inclining the substrate 130 relative to the optical axes 20 and 21. Therefore, this embodiment needs no particular optical member to equalize the two optical path lengths from the recording medium to the photodetectors 11 and 12. In this point, this embodiment differs from the second, third and fourth embodiments.

In the description of the above embodiments of the invention, we have stated that the two optical path lengths are substantially equalized (the optical path difference d is minimized nearly to zero). However, it is to be understood that all the embodiments are required to satisfy the above conditional formula (2).

As readily understood from the foregoing, the above embodiments of the present invention have many advantages.

The second and fourth embodiments shown in FIGS. 4 and 6 use a polarized beam splitter having a relatively simple form which is easy to manufacture and inexpensive. Also required is a couple of total reflection prisms 9, 10 of a simple form or a high refractive index member 15 which also has a very simple form (such as prism or cylinder). Therefore, the pickup apparatus according to these embodiment is inexpensive as a whole.

The third embodiment shown in FIG. 5 in which a polarized beam splitter 14 of a modified form is used has the advantage that greater freedom is given in designing the pattern of the printed substrate 13. By suitably modifying the form of the polarized beam splitter 14 one can easily change the distance between the two photodetectors 11 and 12 on the printed substrate 13 while keeping the two optical path lengths from the recording medium to the two photodetectors equal to each other. Therefore, the difficulty in designing the print pattern of the substrate is removed.

The circuit shown in FIG. 2B can be used also in the second, third, fourth and fifth embodiments.

Obviously many changes and modifications are possible in the above embodiments without departing from the scope of the invention.

What we claim is:

1. An apparatus for projecting a beam of linearly polarized light onto a magnetooptical recording medium and detecting the light coming from said magnetooptical recording medium, comprising:
   (a) first photo-electric conversion means;
   (b) second photo-electric conversion means;
   (c) a substrate on which said first and second photo-electric conversion means are disposed so that said first and second photo-electric conversion means are positioned on a predetermined same plane of said substrate;
   (d) reproducing means for producing a reproducing signal on the basis of outputs of said first and second photo-electric conversion means; and
   (e) optical means for dividing the light from said magnetooptical recording medium into two light components which have different planes of polarization, said optical means having a first optical system for guiding one of said two light components to said first photo-electric conversion means and a second optical system for guiding the other of said two light components to said second photo-electric conversion means so that the optical axes of said two light components are parallel to each other and substantially perpendicular to said predetermined plane, said first and second optical systems being constructed to cause the difference in the optical path length between said two light components to be limited within a predetermined range, whereby Common Mode Rejection Ratio with respect to said reproducing signal is optimum, wherein said optical means satisfies the following condition:

$$d \leq 5 \times 10^8 / f_{max} \text{ (mm)}$$

wherein,
   d is the difference between said two optical path lengths; and
   $f_{max}$ is the maximum frequency contained in said reproducing signal.

2. An apparatus according to claim 1, wherein said optical means satisfies the following condition:
$f_{max} \geq 10$ (MHz).

3. An apparatus for reproducing data recorded on a magnetooptical recording medium, comprising:
   (a) first photo-electric conversion means;
   (b) second photo-electric conversion means;
   (c) a substrate on which said first and second photo-electric conversion means are disposed so that said first and second photo-electric conversion means are positioned on a predetermined same plane of said substrate;
   (d) reproducing means for producing a reproducing signal on the basis of outputs of said first and second photo-electric conversion means;
   (e) beam generating means for generating a beam of linearly polarized light;
   (f) first beam splitter means for transferring at least a part of the light from said beam generating means toward said magnetooptical recording medium;
   (g) second beam splitter means, said first beam splitter means reflecting at least a part of light from said magnetooptical recording medium toward said second beam splitter means, said second beam splitter means dividing the light from said magnetooptical recording medium into two light components which have different planes of polarization, said second beam splitter means having a first reflecting surface which reflects one of said two light components and causes the other of said two light components to pass through said first reflecting surface, and a second reflecting surface which reflects at least a part of said light component reflected by said first reflecting surface;
   (h) first reflecting means for reflecting said light component passed through said first reflecting surface toward said first photo-electric conversion means; and
   (i) second reflecting means for reflecting said light component reflected by said second reflecting surface toward said second photo-electric conversion means;
   (j) said first and second reflecting means being disposed so that the optical axes of said two light components are parallel to each other and substantially perpendicular to said predetermined plane, and so that the difference in optical path length between the two light components incident on said first and second photo-electric conversion means is reduced substantially to zero.

* * * * *